United States Patent
Wang

(10) Patent No.: US 6,710,993 B1
(45) Date of Patent: Mar. 23, 2004

(54) METHOD AND APPARATUS FOR PROVIDING OVERLOAD PROTECTION FOR A CIRCUIT

(75) Inventor: Shenghong Wang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 186 days.

(21) Appl. No.: 09/722,755

(22) Filed: Nov. 27, 2000

(51) Int. Cl.[7] .......................... H02H 3/20; H05B 37/02
(52) U.S. Cl. ...................... 361/93.1; 315/306
(58) Field of Search ................ 361/93.1, 93.2, 361/91.1, 78; 363/21.1, 56.4; 318/254; 315/307, 308; 377/1, 16; 327/135, 306, 309

(56) References Cited

U.S. PATENT DOCUMENTS

| | | | |
|---|---|---|---|
| 5,719,474 A | * 2/1998 | Vitello | 315/224 |
| 5,764,024 A | 6/1998 | Wilson | 323/283 |
| 5,862,044 A | 1/1999 | Shioya et al. | 363/21.01 |
| 5,892,665 A | 4/1999 | Matsumoto et al. | 361/94 |
| 6,127,789 A | * 10/2000 | Ishizuka et al. | 315/128 |
| 6,160,361 A | * 12/2000 | Giannopoulos et al. | 315/307 |
| 6,347,028 B1 | * 2/2002 | Hausman et al. | 323/276 |
| 6,400,127 B1 | * 6/2002 | Giannopoulos | 323/283 |

OTHER PUBLICATIONS

Ivan Tomek Computer Architecture and Organization W.H. Freeman and Company 1990. pp. 355–369.*

* cited by examiner

Primary Examiner—Brian Sircus
Assistant Examiner—Boris Benenson

(57) ABSTRACT

A method and apparatus for voltage/current overage condition protection for a lighting control circuit. The method provides a hybrid software and hardware solution to take advantage of the useful attributes of both. Overages are sensed in hardware by digital comparators, where the thresholds used as the basis for comparison are predefined in software. When an overage is detected, the circuit outputs, which are controlled by a plurality of counters, are changed by changing the source of the pulse width data used by the counters from software control to predetermined minima stored in a plurality of registers.

31 Claims, 3 Drawing Sheets

METHOD AND APPARATUS FOR PROVIDING OVERLOAD PROTECTION FOR A CIRCUIT

TECHNICAL FIELD

This invention relates generally to a method and apparatus for providing overload protection for a circuit. This invention has particular application in the protection of a digital ballast used for controlling electric lamps.

BACKGROUND OF THE INVENTION

Fluorescent and High Intensity Discharge (HID) lamps are commonly controlled by an electronic ballast. The ballast drives the lamp with an alternating square wave of a particular frequency. The reason this is done is that due to the physics of such lamps, current cannot pass in one single direction continually without adversely affecting the operation of, or damaging, the lamp. As well, due to the physics and composition of the electronic ballast which drives the discharge lamp, there are inherent limits as to the voltage which can exist across, and the current which can flow through, the ballast and the lamp. Voltages in excess of the maximum rated voltage for the lamp, as well as currents in excess of the maximum rated current for the lamp, will damage the lamp. These ratings vary with the type and robustness of the lamp in question. Accordingly, protections for an over-voltage or an over-current situation are very important in the design of lighting systems. As well, panic protection (i.e., protecting against a transient surge with extremely fast onset) and the related ability of the lamp driving circuit to automatically shut itself off, or dramatically decrease the voltage across it, and the current passing through it, is necessary. The existence of protections such as these in the ballast system can potentially save the lamp and ballast, as well as peripheral equipment.

Generally, electronic ballast overload protection is effected using analog comparators, where an overload protection circuit comprising analog comparators is hardwired to the lamp, and designed to continually sense the lamp voltage and the lamp current. If the value of the voltage or current is larger than a reference value built into the comparator, the comparator will output a signal to shut down the switching pulse generated by the ballast and the lamp will not be driven. Certain ballasts are microprocessor based. These microprocessor-based ballasts may also use analog comparators to detect the lamp voltage or the lamp current and shut down the switching signal when there is an overage.

Alternatively, the output of the analog comparator can be sent to the central processing unit (CPU) of the microprocessor driving the lamp with a pulse width modulated (PWM) signal. The comparator output will activate a software program that will change the PWM module's settings to either shut down the switching pulse or to reduce the pulse width so as to insure that the power delivered to the lamp will be low enough to resolve the overcurrent or overvoltage condition.

Therefore, in the current state of the art, electronic ballast overload protection is effected via either analog circuitry operating alone or analog circuitry operating as an auxiliary to a microprocessor; in both cases sensing is done via analog comparators; in the former case the comparators generate the signal which shuts down the switching pulse via a hardware circuit. In the latter case, the comparators signal the CPU which shuts down the switching pulse, or reduces its pulse width, driving the lamp.

There are problems inherent in both methods currently used to provide overload protection for an electronic ballast. What will first be discussed is the pure hardware solution using analog comparators. The use of analog comparators for ballast failure protection is both unstable and unreliable. In the first instance, the parameters of the protection circuit are sensitive to variations in temperature and process technology, and are therefore plagued by substantial variability from the nominal values of maximum current and maximum voltage that they protect against. Additionally, even assuming that the reference voltages and reference currents in the comparators can be suitably or acceptably calibrated for the circuit in which they are used, the resulting protection circuit would not be programmable or of much use in any other circuit. Accordingly, in the analog pure-hardware protection circuit, it would only be useful for protecting against one particular voltage and one particular current limit. Such a protection circuit would neither be universal or adjustable in any sense and could not be used as a standard component of a ballast designed to control a variety of lamps and lamp driving circuits.

On the other hand, using a pure software solution does gain the advantage of flexibility, in that the maximum current and maximum voltage against which the protection circuit protects can be programmable. Thus the circuit can be used with a variety of lamps and lamp driving circuits, as well as offering flexibility to change the overload maxima as noise and other conditions may warrant. All that is needed is to reprogram the CPU to change the PWM signal upon a particular condition (e.g., maximum voltage) occurring for example, if the override circuit trips at too low a voltage, then values utilized by the software can simply be changed. The hardware solution would require various component changes.

The speed with which the overage decision-making process can be made in the pure-software solution is generally too slow to protect circuits from a panic or near panic situation. A panic situation is one where there is a severe current overage or a severe voltage overage occurring in the lamp and the protection circuit must respond immediately if the damage to the lamp is to be prevented. The CPU and software simply take too long to respond.

In general, providing overload protection via analog hard wiring is inaccurate and inflexible. Providing the protection in the CPU software means that any overload condition has to be processed through the CPU, because an adjustment must be made, and a new PWM signal generated. This takes too long.

As a result of the foregoing discussion, clearly a significant need exists in the art for an overload protection circuit for an electric lamp which can provide both the programmable flexibility of a software solution with the immediacy and speed that can only be currently delivered by a hard-wired overload protection circuit.

SUMMARY OF THE INVENTION

The above-described shortfalls of the prior art are overcome in accordance with the teachings of the present invention which relates to an apparatus and method for providing overload protection for a circuit by means of a hybrid software and hardware solution. In the preferred embodiment, this circuit is used in a digital ballast controlling electric lighting using a half-bridge power converter commonly used to control fluorescent lamps. The invention can easily be expanded to a four-bridge power converter circuit used for controlling HID lamps. In either case the driving output is an AC pulse train.

In a preferred embodiment, PWM signals are determined by the value stored in one of two registers. The value in a first register is used during normal operation. In overload conditions, a hardware digital sensor is used to directly cause the system to use the value in the second register to control the PWM signal without signaling the CPU software to adjust the PWM signal. Thus, the PWM signal is adjusted to account for the overload without the delay required for the CPU to process the overload. Nonetheless, since the overload condition is handled by changing digital values controlling a PWM signal, the flexibility of software solutions is maintained, since changing conditions only require that a different value be stored in the overload register or the digital sensor.

Effectively, the pulse trains are specified and generated via hardware logic gates and stored data during overload conditions, and software instructions otherwise (e.g. normal conditions).

DETAILED DESCRIPTION OF THE PREFERRED EMBODIMENT

For purposes of explanation, we refer herein to pulse width modulation (PWM) switches, or high frequency switches. These switches are well known in the art for driving florescent and HID lamps. They operate by means of generating an alternating current square wave that is used to drive the lamp during steady state operation, as is well known in the art. The actual driving pulse in these ballasts, whose duty cycle and frequency affect the intensity or luminance of the lamp, is generated by either a single pulse generator, a half bridge power converter, or a full bridge power converter circuit. In the latter two cases (and theoretically, there could be circuits with an arbitrary number of pulse generators in them) the multiple pulses are out of phase relative to each other and are combined to generate the lamp driving pulse. Such circuits are generally known in the art.

Also for purposes of explanation, we refer to the digital lamp signal processor (DLSP) module of the digital ballast system architecture. The method and apparatus of the present invention are implemented via certain additions to and embellishments of the DLSP and PWM modules of the digital ballast system architecture for an electric lamp.

Figure 1:
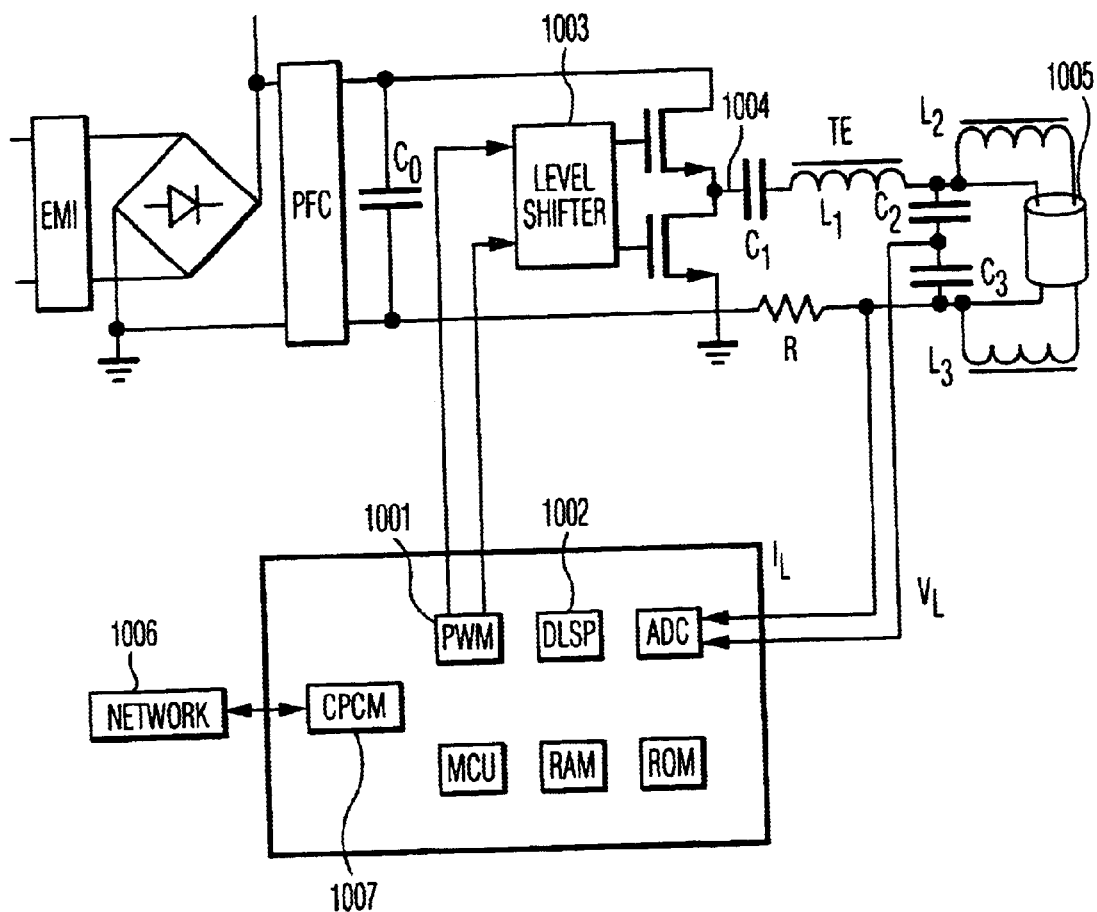
FIG. 1 shows an exemplary standard digital ballast system architecture for controlling electric discharge lamps.

A state of the art digital ballast system architecture is provided in FIG. 1. As can be seen therein, the output of the PWM is two pulse trains, which are fed through the level shifter 1003, and combined as the input to the capacitor C1 1004, which drives the lamp 1005. The ballast can communicate to a central lighting network 1006, via a communications interface (labeled as the "Communications Protocol Control Module", or CPCM) 1007. The inventive circuit is described with reference to FIG. 2.

In accordance with the preferred embodiment of the present invention, the PWM module of a digital ballast system architecture is augmented by the inclusion of a new register shown as R Min, also termed the overload register. Generally, Rmin is also thought of as the overload register, since its value is used to control the light being controlled in overload condition. 2001 in FIG. 2 and the DLSP module is augmented by the addition of four new registers entitled Maxv_s 220, Maxv_r 221, Maxi_s 222, Maxi_r 223, and by two digital comparators COMPV 224 and COMPI 225.

As is known in the art, the duty cycle of the pulse trains 2015 and 2016 control the intensity of the light. In the present invention, the idea generally is to control the duty cycle of such pulse trains in accordance with commands received through the Mode frequency circuit 2017 loading data into a particular register. However, when the system experiences an overload condition, or other panic condition, an immediate switch over occurs to load a specified predetermined value into the registers controlling the intensity of the light. This immediate switch over to the specified value causes the pulse train to be of such duration that the light may be kept illuminated minimally, rather than being turned off. However the switch over to the predetermined overload value does not occur through the microprocessor or software, but rather occurs independent of the microprocessor via directly connected hardware circuitry including the appropriate logic.

Figure 2:
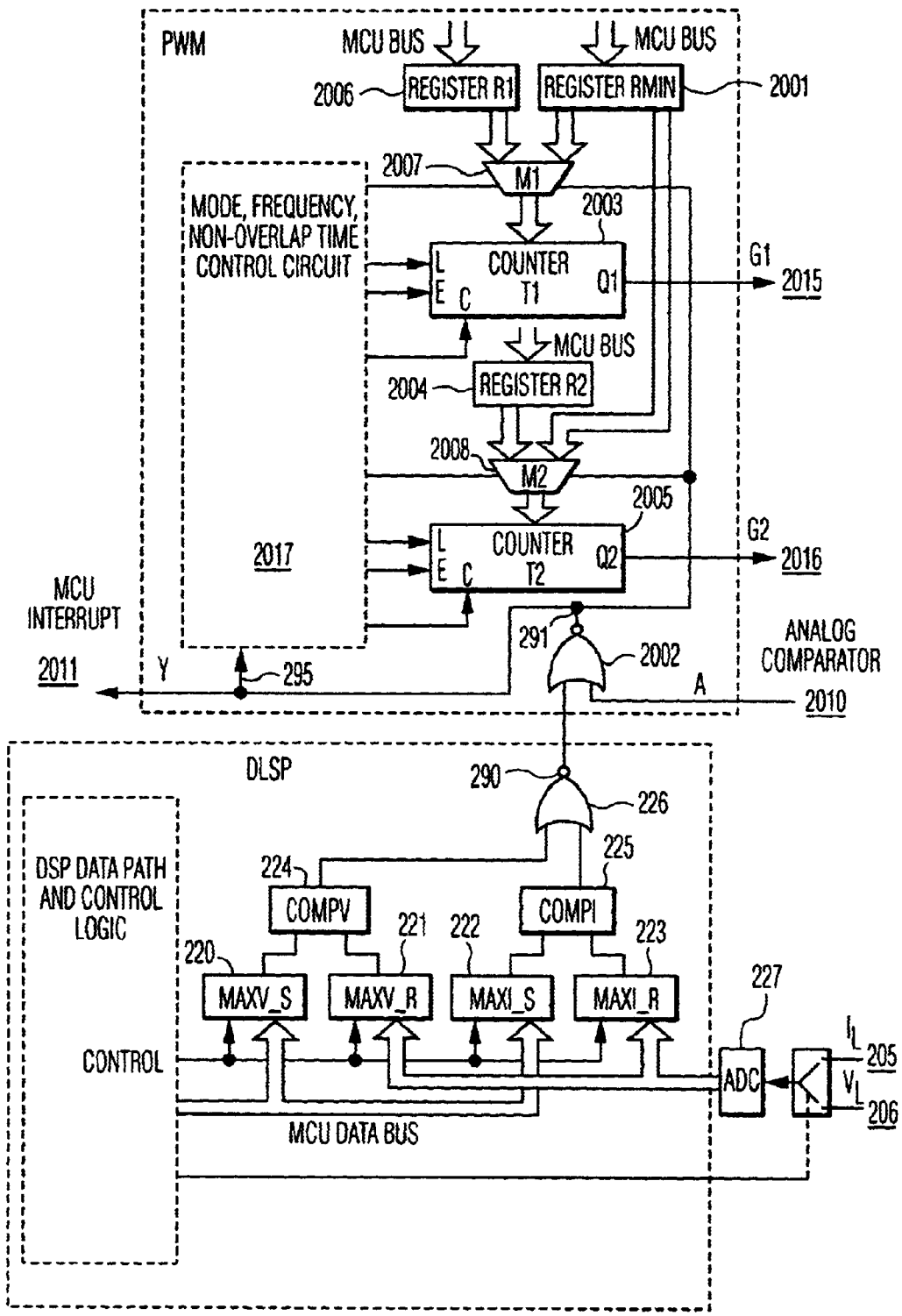
FIG. 2 depicts an exemplary block diagram of the PWM and DLSP modules of a ballast system as augmented by the additional over-voltage and over-current protection components and circuitry of the invention.

Turning to FIG. 2, an exemplary embodiment of the present invention is shown therein. In normal operation, the duty cycle of the pulse train on lines 2015 and 2016 combine control of the lighting parameters of the light as is known with respect to conventional techniques. The value stored in counter 2003 and 2005 determine such duty cycle, and hence control the intensity of the light. In normal operation, either a computer or a manual mode may be used to control such intensity.

In either case, a signal read by the processor is utilized by mode frequency circuit 2017 in order to load registers 2006 and 2004 with the appropriate value. Thus, if the lighting device is being manually controlled, turning a dimmer switch up will be detected and digitized and transmitted as a delta signal to mode frequency circuit 2017. Mode frequency circuit 2017 will then transmit a new appropriate value to registers 2006 and 2004. Still in normal operation, selectors 2007 and 2008 will propagate the value in registers 2006 and 2004, respectively, into their associated counters 2003 and 2005. The changed counter values will then cause a change in duty cycle of the pulses controlling the lighting device to either increase or decrease the intensity thereof.

Simultaneously, with normal operation, samples of the current and/or voltage are input on lines 205 and 206. The samples are digitized by an analog to digital converter (ADC) 227. The combination of the components 205, 206 and 227, as well as items 220–226 of FIG. 2, can be thought of as a digital sensor in that they result in the constant sensing of overloads on lines 205 and 206 in a digital manner.

Turning to the specifics, registers 220 and 222 store a set maximum value of voltage and current, respectively. These values correspond to the maximum values of these parameters beyond which it is desirable to invoke the overload protection. Registers 221 and 223 store the real time values of the voltage and current being monitored from the lamp on lines 205 and lines 206, and being received in digital form through ADC 227. The invention contemplates constantly and continually updating the value stored in registers 221 and 223 so that the system can immediately respond to an overload condition.

The basic idea behind the overload protection mechanism of the present invention is to, upon detection of an overload, immediately change the selection made by selectors 2007 and 2008. Specifically, the selectors should be immediately changed in order to receive their value not from registers 2006 and 2004 respectively, but from overload registers 2001. In this manner, since overload register 2001 contains a value that will keep the light illuminated at a minimum level, the intensity of the light being controlled will not follow the tremendous value that would be placed into counters 2003 and 2005 by registers 2006 and 2004 due to a surge in electrical power, or other overload condition.

Upon detection of an overload upon either lines 205 or 206, the value output by ADC 227 and placed into registers 221 and 223 will exceed the prespecified maximum. For exemplary purposes herein, we presume that there has been an overload in the current on line 205. Such a condition will mean that the value in register 223 will exceed the value in register 222, causing a true output from comparator 225. Such a condition, or even a voltage overload on line 206, will cause a true output on line 290.

OR gate 2002 ORs the true output from line 290 with an analog comparator 2010. The analog comparator may be connected to any system which puts out a true when any other analog signal exceeds a predetermined value. For example, a temperature sensor or other device may also be involved in generating an overload condition. If the current and voltage from lines 205 and 206 are the only values being monitored for overload conditions, then analog comparator 2010, which is actually a digital output, can simply be tied to a logical true. Alternatively, OR gate 2002 could simply be eliminated, with line 290 connected to directly to point 291.

In any event, presuming line 290 becomes true, the selectors 2007 and 2008 will be immediately signaled to shift operation such that the counter value loaded through into counters 2003 and 2005 will be from overload register 2001, and not from registers 2006 and 2004 as in normal operation. The register 2001 contains a value stored in advance by the system to ensure the light is maintained on with a specified and preferably minimum power.

It can be appreciated from the above that through a small number of logic gates and registers, all of which can be manufactured to operate in the microsecond or even faster range, an immediate switch over can occur and the pulse trains utilized to control the lighting device can be adjusted appropriately. More specifically, upon an overload which would drive the values normally located in counters 2003 and 2005 out of bounds and cause damage to the lamp, the values loaded into these registers are immediately switched to a new source, the new source being preprogrammed such that inappropriate minimal amount of light can be maintained until the overload conditions are corrected.

It can be appreciated from the foregoing that the invention has the benefits of both prior art hardware and software solutions. More specifically, the invention has the benefit of hardware solutions and that it does not require processing overload conditions by software in a CPU and the resulting delay. Instead, the system immediately signals the selectors 2007 and 2008 through hardware logic gates and causes a switch over to the appropriate source for control.

Nonetheless, the invention also has the advantages of software prior art solutions. More specifically, to the extent that any of the sensing components change, or different conditions arise, the overload protection offered by the circuit can be adjusted simply by changing the values and registers in 220 and 222, and changing the value in overload register 2001.

Figure 3:
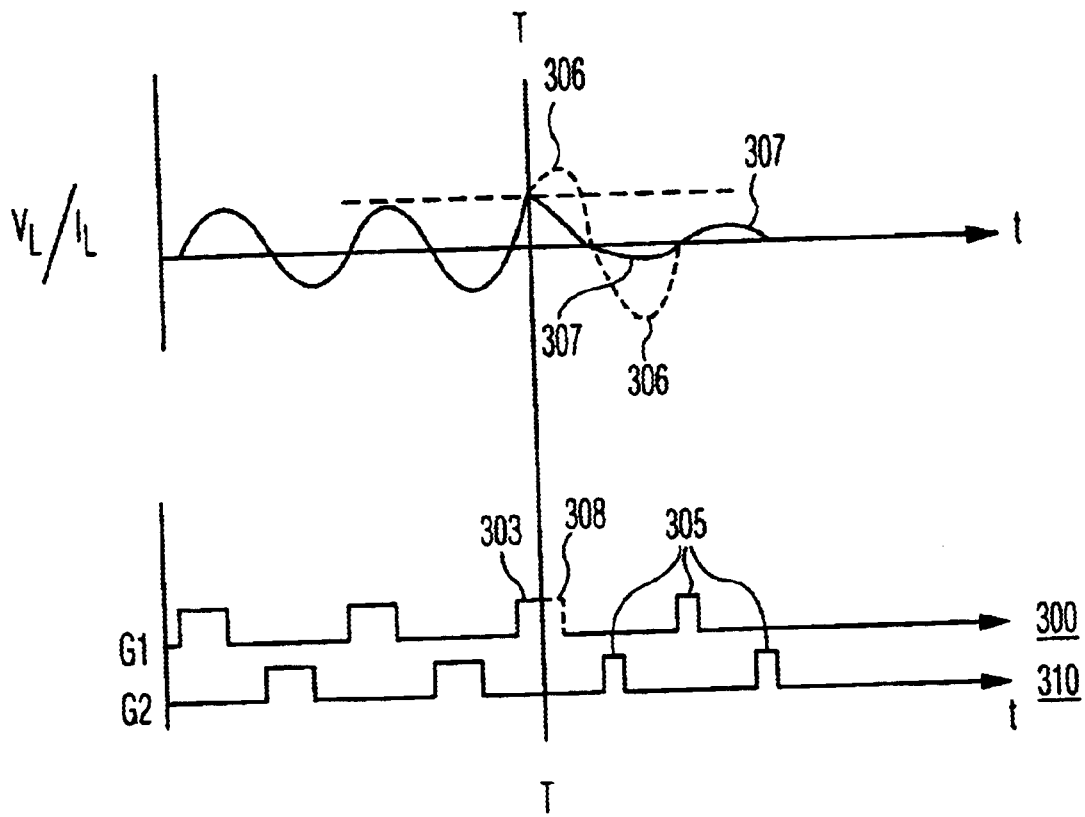
FIG. 3 illustrates a current/voltage overage situation in an electric lamp being resolved in accordance with the method of the present invention.

FIG. 3 depicts an exemplary overage situation and its resolution occurring in a circuit such as depicted in FIG. 2, utilizing the method of the present invention. The top plot is the voltage and current (normalized to the same amplitudes), and the bottom plots are the output of each of the counters T1 and T2, i.e. the signals G1 300 and G2 310. Note that the G1 signal pulse 300 goes high at the beginning of a period. The G2 signal 310 is out of phase with the G1 signal, and goes high midway through the period. This relationship between the G1 and G2 signals is generally known as symmetrical pulses. There are a variety of alternate modes under which the phase, polarity, and frequency attributes of the signals G1 and G2 can be generated, which are well known in the art. For simplicity, the symmetric pulses mode will be used here as an example.

The dotted horizontal line in the voltage/current plot of FIG. 3 is the threshold above which an overload condition is signaled by the comparators (COMPV 224 and COMPI 225 in FIG. 2). At the beginning of the third period, G1 pulse 303 triggers an overload condition, at the time where the veritcal line TT crosses the time axis. This causes two things to occur. First, the pulse 303 is halted at this time, regardless of whether the pulse has yet reached the stored minimum pulse width. This is to insure that the overload condition resolves, by delivering no power at all to the lamp for a predetermined time period. As can be seen, the voltage/current thus drops to zero. In this example, where symmetric pulses are used, the time period will be at least half of a period. This halting of all pulses is effected by means of a latch, either handled in software, or in hardware logic, in the Mode, Frequency, non-overlap time control circuit 2017 in FIG. 2, and precludes any oscillation in the voltage delivered to the lamp (due to the overload signal going low as soon as the voltage/current goes below the threshold, and the voltage delivered to the lamp then going high again). FIG. 2 indicates where the overload signal is fed into said control circuit 2017, at point 295. The dotted second half of the pulse 308 shows what it would have been without the overload protection being effected.

Secondly, due to the overload condition, the comparators' output signal has selected the Rmin register 2001 (FIG. 2) as the source of the pulse width information used by the counters, and thus (after the predetermined time period of no pulses has expired) the minimum pulses 305 are output, immediately reducing the power and the voltage/current in the lamp.

As a result of the now minimum width pulses, the voltage/current in the lamp is now at a minimum value 307. The dotted curve 306 on the voltage/current plot in FIG. 3 indicates where the values would have been were it not for the overload protection. The minimum pulses continue to be output until some predetermined time (not shown in FIG. 3) has elapsed, when, with reference to FIG. 2, the control circuit 2017 again selects Registers R1 2006 and R2 2004 as the pulse width data sources of the counters T1 2003 and T2 2005. This time interval is controlled by the control circuit 2017 itself under control of the microcontroller, and can be implemented in either software or hardware.

While the foregoing describes the preferred embodiment of the invention, it is understood by those of skill in the art that various modifications and variations may be utilized, such as for example, using the invention in circuits that have any waveform as driving outputs, both ac and dc, and the extension of the circuit of the preferred embodiment to any number of output signals, each with one or more hardware and software data sources. Such modifications are intended to be covered by the following claims.

What is claimed:

1. A method of controlling a lighting device comprising the steps of:
   supplying pulse trains, the pulse trains having characteristics to determine intensity of the lighting device;
   causing the pulse trains to be controlled from a value in a first register during normal operation of said lighting device, and instantaneously controlling the pulse trains from a second register during an overload condition.

2. The method of claim 1 further comprising converting a parameter of the lighting device from analog to digital form to detect the overload condition.

3. The method of claim 1 further comprising; storing predetermined values for maximum current and maximum voltage, and comparing measured current and voltage values to the stored maximum current and voltage values, in order to detect an overload condition.

4. The method of claim 3 wherein said step of causing comprises controlling a selector to load the value from the first register into a counter during normal operation, and to instantaneously load the value from the second register into the counter during an overload condition.

5. Apparatus for providing overload protection to a lighting device, the apparatus comprising:
   a first register for storing a first value utilized to control said lighting device during normal operation, and a second register for storing a second value utilized to control said lighting device during an overload condition; and
   a microprocessor for controlling what value is stored in said first register, but not being used to cause said second value to be utilized to control said lighting device.

6. The apparatus of claim 5 further comprising at least one logic gate arranged to cause said second value stored in the second register to be utilized to control said lighting device upon detection of an overload condition, and independently of the microprocessor.

7. The apparatus of claim 5 further comprising a plurality of comparators for comparing measured parameters to predetermined stored parameters to detect an overload condition, and for directly causing said second value to be used without intervention by the microprocessor during said overload condition.

8. A circuit for controlling a lighting device comprising:
   a pulse generator for generating at least one pulse train having a duty cycle indicative of a power level at which said lighting device should operate;
   a microprocessor for executing software that causes said pulse generator to operate in accordance with user control to set said power level during normal operation; and
   at least one logic gate to substantially instantaneously cause said pulse generator to generate said at least one pulse train in a predetermined manner that provides a safe non-zero power level for the lighting device upon hardware detection of a specified overload condition.

9. An apparatus for driving a lighting device by outputting a plurality of pulse trains to control the intensity of the light, comprising:
   a plurality of pulse train generators;
   means for causing the data input to each pulse train generator to be from a first memory element under normal operation, and from a second memory element under an emergency condition.

10. The apparatus of claim 9 further comprising a microprocessor for executing software, where the software sets predetermined thresholds defining the emergency conditions and stores said thresholds in at least one further memory element.

11. The apparatus of claim 10 further comprising one or more hardware sensors which test for the predetermined thresholds defining an emergency condition.

12. The apparatus of claim 9 wherein said means for causing includes at least one comparator and a selector.

13. The apparatus of claim 9, further comprising a preventor, arranged to prevent pulses to be generated for a predetermined time interval at the beginning of the emergency condition.

14. The apparatus of claim 13, where said preventor comprises a latch circuit.

15. A method for controlling a counter in a ballast apparatus for an electric discharge lamp, comprising:
   storing data in two sources;
   sensing an overload condition, and
   choosing which source is a counter control input based upon whether the overload condition exists.

16. The method of claim 15, where the overload condition is sensed in hardware.

17. The method of claim 16, where the data sources are set in software.

18. The method of claim 17, where the ballast apparatus includes first and second counters and the outputs of the counters are pulse trains.

19. The method of claim 18, where the overload condition is sensed prior to the beginning of a next pulse.

20. The method of claim 19, where upon the sensing of the emergency condition no pulses are output for a predetermined time interval.

21. The method of claim 19, where the pulse trains generated after the sensed emergency condition cause a predetermined minimum power to be delivered to a light.

22. A method of operating an electric discharge lamp which comprises:
   outputting a plurality of pulse trains to control the light intensity of the discharge lamp,
   generating the plurality of pulse trains during normal operation of the discharge lamp via software in a microprocessor, and
   generating the plurality of pulse trains with a modified duty cycle via hardware and exclusive of the microprocessor in the event of an overload condition.

23. The method of claim 22 where the generated pulse trains are combined to generate a driving signal for the discharge lamp.

24. The method of claim 22 where the emergency condition is defined by exceeding or falling short of certain circuit parameters, and where said thresholds are set in software.

25. The method of claim 22 further comprising an initialization step, performed prior to the pulse train generating step, where the data used to generate the pulse trains by the hardware is set by the software.

26. The method of claim 25, where the emergency condition is determined by hardware.

27. A hybrid apparatus for operating an electric discharge lamp comprising:
   a pulse generator for generating at least one pulse train to control the level of power supplied to the discharge lamp,
   a microprocessor for executing software that causes said pulse generator to operate in accordance with user control to set the power level for normal operation of the discharge lamp, a first memory device for storing a first value utilized to control said discharge lamp during normal operation, and a second memory device for storing a second value utilized to control said discharge lamp during an overload condition, and means for immediately deriving a control signal for instantaneous control of the pulse generator via the second memory device during an overload condition of the apparatus and in response to an instantaneous value of an electric parameter indicative of said overload condition.

28. The hybrid apparatus as claimed in claim 27 wherein the control signal deriving means controls the pulse generator during an overload condition via a circuit path that is independent of the microprocessor.

29. The hybrid apparatus as claimed in claim 27 wherein the microprocessor software sets predetermined thresholds defining the overload condition and stores said thresholds in at least one further memory device that is operative during the overload condition.

30. The hybrid apparatus as claimed in claim 27 wherein the microprocessor controls the first and second values stored in the first and second memory devices, respectively.

31. The hybrid apparatus as claimed in claim 27 wherein the power level of the discharge lamp is controlled by high frequency control of the duty cycle of the at least one pulse train generated by the pulse generator such that the duty cycle is controlled in each high frequency switching cycle during an overload condition.

* * * * *